United States Patent
Efrati

(10) Patent No.: US 9,420,010 B2
(45) Date of Patent: Aug. 16, 2016

(54) VOICE OVER IP CALL SETUP PROGRESS INDICATOR

(71) Applicant: Vonage America Inc., Holmdel, NJ (US)

(72) Inventor: Tzahi Efrati, Hoboken, NJ (US)

(73) Assignee: Vonage America Inc., Holmdel, NJ (US)

( * ) Notice: Subject to any disclaimer, the term of this patent is extended or adjusted under 35 U.S.C. 154(b) by 42 days.

(21) Appl. No.: 13/754,032

(22) Filed: Jan. 30, 2013

(65) Prior Publication Data

US 2014/0211633 A1     Jul. 31, 2014

(51) Int. Cl.
*H04L 29/06*     (2006.01)

(52) U.S. Cl.
CPC ........ *H04L 65/1069* (2013.01); *H04L 65/1053* (2013.01)

(58) Field of Classification Search
CPC .................. H04L 65/1069; H04L 65/1053
See application file for complete search history.

(56) References Cited

U.S. PATENT DOCUMENTS

| | | | |
|---|---|---|---|
| 6,259,691 B1 * | 7/2001 | Naudus ............... | H04M 7/1295 370/352 |
| 8,265,083 B1 | 9/2012 | Cannon et al. | |
| 2005/0190746 A1 * | 9/2005 | Xiong .................... | H04L 12/66 370/352 |
| 2006/0245560 A1 * | 11/2006 | Jeng ...................... | H04M 1/575 379/88.19 |
| 2008/0139186 A1 * | 6/2008 | Ringland ............ | H04M 1/2745 455/415 |
| 2010/0261461 A1 * | 10/2010 | Gosselin ........... | H04M 3/42042 455/414.1 |
| 2013/0308499 A1 * | 11/2013 | Hodge ................ | H04M 3/2281 370/259 |
| 2013/0308630 A1 * | 11/2013 | Alexander ........ | H04L 29/06387 370/352 |

\* cited by examiner

*Primary Examiner* — Ajay Cattungal
(74) *Attorney, Agent, or Firm* — Moser Taboada; Joseph Pagnotta

(57) ABSTRACT

A method and apparatus for providing voice over internet protocol (VoIP) call setup progress status comprising creating an indication associated with a call placed from a client VoIP device in a providing network, modifying the indication periodically based on call setup progress and presenting the modified indication.

19 Claims, 4 Drawing Sheets

VOICE OVER IP CALL SETUP PROGRESS INDICATOR

BACKGROUND OF THE INVENTION

1. Field of the Invention

Embodiments of the present invention generally relate to a voice over internet protocol (VoIP) service, and more specifically, to a VoIP call setup progress indicator.

2. Description of the Related Art

Establishing VoIP calls, particularly international calls, may take a significant amount of time to go through the various signaling and media stream establishment stages. Delay between placement of the call and reception of the call is due to the various stages the call goes through from the originating network to the destination network. Call setup involves performing authentication, performing database searches, transferring or hopping between various networks and the like. In hopping networks, the originating network may have difficulty in negotiating call exchanges and the like, and may seem to be "stuck", creating a delay in establishing the call. This delay can cause users to lose confidence in the VoIP system and, in some cases, to disengage calls because they are unsure of the progress of the call, i.e., whether the call setup has become stuck or the network has disengaged the call.

Therefore there is a need in the art for a method and apparatus for providing a VoIP call setup progress indicator as feedback for a user.

SUMMARY OF THE INVENTION

Embodiments of the present invention relate to a method for providing voice over internet protocol (VoIP) call setup progress status comprising creating an indication associated with a call placed from a client VoIP device in a providing network, modifying the indication periodically based on call setup progress and presenting the modified indication.

Further embodiments of the present invention relate to an apparatus for providing VoIP call setup progress comprising a progress reception module for receiving call setup progress on a call placed by a user of a client device and presenting the user with an indication of an initial call placement, an indication modification module for modifying the indication periodically based on the call setup progress, and a presentation module for presenting the user with the indication each time the indication is modified.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to VoIP calls. According to one embodiment, a user is presented with an indication of call initiation, and the indication is modified during various stages of the call setup. In some embodiments, the network provides the user's client device with the call setup progress information, and the client device modifies the indication to update the user. In other embodiments, the network provides a modified indication to the user's client device, which then displays the indication to the user. The indication can be an audio, visual or tactile indication, or any other type of indication which alerts the user in a prompt manner as to the progress of the call setup. One of ordinary skill in the art would recognize that methods of indication besides audio, visual and tactile may be utilized in alerting the user.

Figure 1:
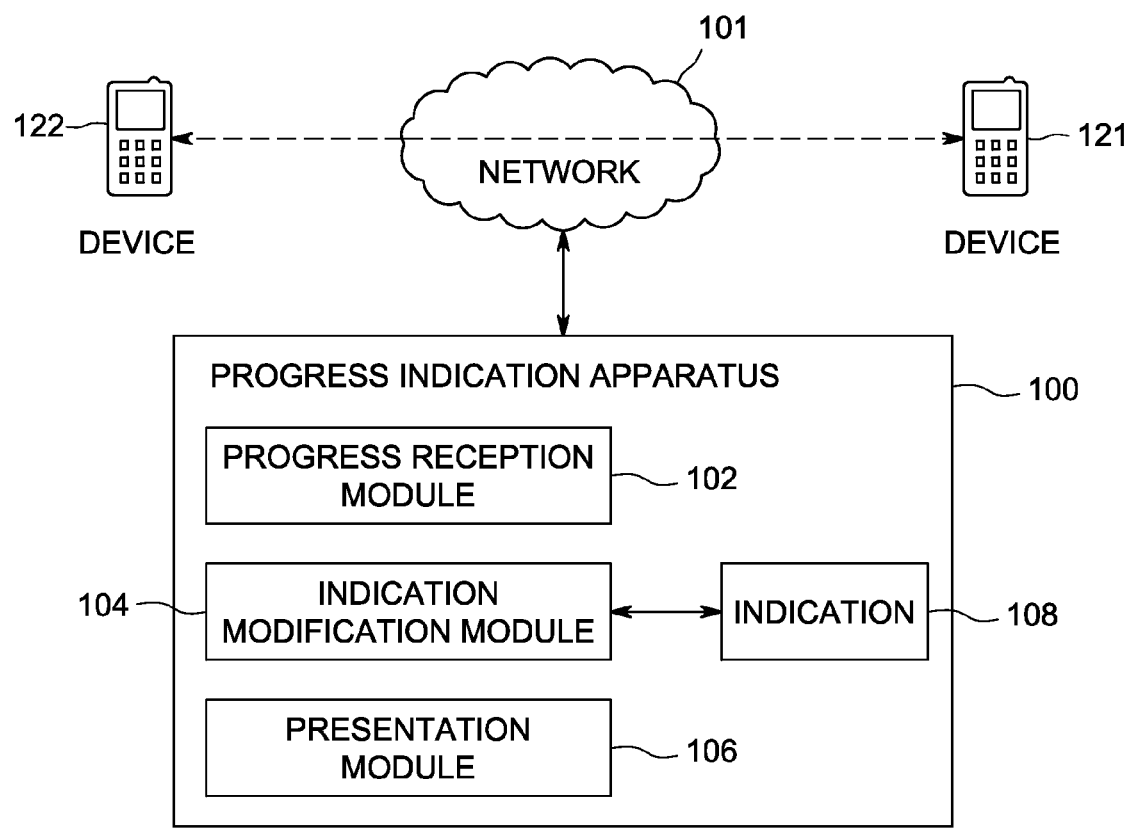
FIG. 1 is an illustration depicting a progress indication apparatus in accordance with one or more embodiments of the present invention.

FIG. 1 is an illustration depicting a progress indication apparatus 100 in accordance with one or more embodiments of the present invention. The progress indication apparatus 100 comprises a progress reception module 102, an indication modification module 104 and a presentation module 106. According to this embodiment, the progress indication apparatus 100 is either located as hardware within a network 101, or runs as software connected to, or within, the network 101. In other embodiments, the progress indication apparatus 100 may be implemented as a combination of hardware and software located in the network 101 or within the client device 121. According to some embodiments of the present invention, the network 101 is a VoIP network, or any compatible packet based network.

A user of the VoIP network 101 initiates a call from device 121, (a client device), to device 122 (a third party device), which may be a mobile phone, a land-line device connected to a PSTN network, another VoIP device, a computer telephony software application, or any other device adapted for use on a telecommunications network. The user of the device 121 initiates the call by entering the phone number, or selecting the name of the device or user of the device 122. At this point, the VoIP network 101 receives the call request and performs validation and authentication operations on the device 121. The authentication services may involve inspecting authentication tables to determine whether the device 121 is a valid device for the VoIP network 101 and the user is authorized to make calls from this device.

The authentication process also determines which plan the user has subscribed to, and which services are available. After the authentication process, the network 101 may look at the identification of the calling party, determine whether the calling party is an "on-net" user, determine which types of calls the device is supports such as video or high definition calls, build a network path to the called party or the recipient, and any other stage used in call placement. More detail is found in U.S. Pat. No. 8,265,083 for "Systems and Methods of Providing Communication Services" issued on Sep. 11, 2012 which is herein incorporated by reference in its entirety. In some instances, for example, where the device 122 is a mobile device, the network 101 may transfer control of the call to another network, such as a GSM network, or another IP network in order to connect with computer based clients. Eventually, the call originating from device 121 connects to the device 122 and the two users can speak.

As the call setup progresses in the network 101, the progress indication apparatus 100 is informed of each step in the setup process. The progress reception module 102 receives notification that a setup step has been concluded during the call setup progress. Once the call leaves the network 101, the network 101 forwards any progress messages received from external networks regarding call setup progress to the progress reception module 102 of the progress indication apparatus 100. The indication modification module 104 receives notice from the progress reception module 102 that a change in progress has occurred, and modifies an indication 108 stored in the indication apparatus 100.

According to some embodiments, the type of the indication 108 is stored as a part of the user's profile in the network 101. In other embodiments, the indication 108 is a predetermined indication. According to some embodiments, the indication 108 can be one or more of an audio ring-tone, a visual indicator, or tactile feedback, either stored locally in the client device 121, or stored remotely in the network 101. In the case where the indication 108 is a visual indicator or tactile feedback, the indication 108 stores data regarding how the indicator will be formatted in the client device 121 or the network 101.

The indication modification module 104 modifies the indication 108 pattern, tone, pitch, frequency, or replaces the indication 108 with another indication, similar in type to the previous indication. For example, if the indication 108 is an audio ring-tone, the audio ring-tone is replaced with a modified pitch ring-tone when the progress reception module 102 receives a notification that call setup has progressed to the next step. According to some embodiments, the network 101 provides the audio indication to the client device 121 and the client device 121 renders the visual feedback.

The progress indication apparatus 100 further comprises a presentation module 106, which, when the indication modification module 104 has modified the indication 108, presents the indication 108 to the device 121. If the user has preconfigured their device 121 to only receive audio indications of call setup progress, the presentation module 106 presents the indication 108 as an audio indication, and the client device 121 functions similarly for other types of indications.

The client device 121 can be configured to receive audio as well as other types of indications. In addition, according to some embodiments, the presentation module 106 determines the specifications of the device 121 and returns only those indications which the device 121 is capable of receiving, for example, audio and tactile only, or any combination of indication types. If the device 121 is capable of receiving and presenting all types of indications, the device 121 can be configured to display all indications, or to display those indications preferred by the user of device 121. In addition, the network 101, according to some embodiments, may store configuration parameters for the type of indications which are sent by the presentation module 106, where certain types of indications are permitted to some users, and other types are prohibited.

Figure 2:
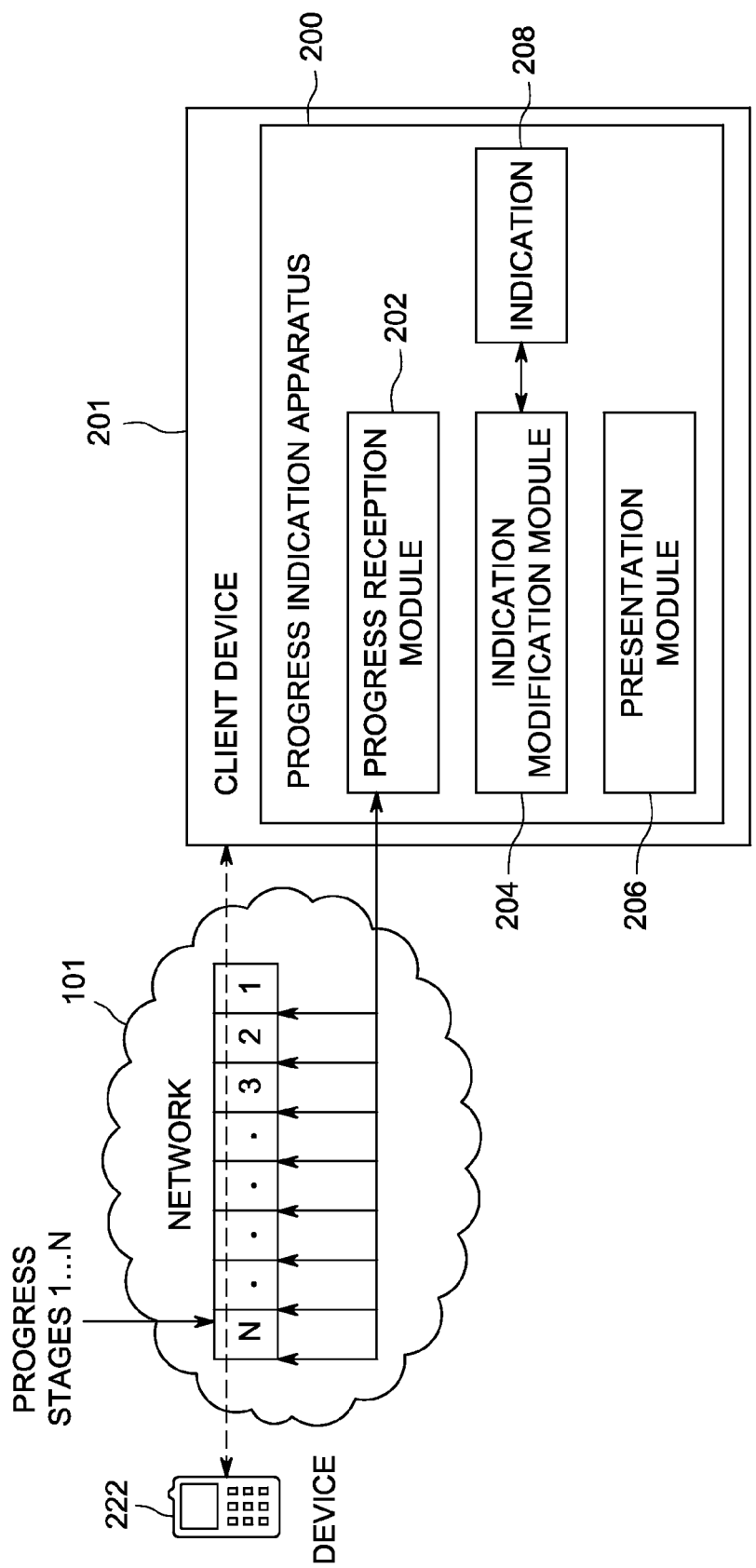
FIG. 2 is an illustration depicting a progress indication apparatus in accordance with another embodiment of the present invention.

FIG. 2 is an illustration depicting a progress indication apparatus 200 in accordance with another embodiment of the present invention. According to this embodiment, the progress indication apparatus 200 is located as a software or hardware component within a client device 201. The progress indication apparatus 200 comprises a progress reception module 202, an indication modification module 204 and a presentation module 206. The indication 208 is also stored in the client device 201 and accessed by the client device 201 and the indication modification module 204.

Initially, a user of the client device 201 places a call over the network 101 to a target device 222. The call setup progresses through various stages 1 . . . N as shown in FIG. 2. In some embodiments, the call may be rerouted through various network devices located in network 101, and each network device "hop" may be considered a call setup stage. According to some embodiments, the user can configure what is considered a call setup stage, and according to other embodiments, the network pre-configures each call setup stage definition. In some instances, the call may be received at a network terminator, and a call setup stage update notification can be sent to the client device 201 after reaching the terminator.

After each call setup stage in the call setup is complete, a notification is sent to the progress reception module 202. The progress reception module 202 transmits a notification to the indication modification module 204 to modify the indication because a new step in the call setup has started. The indication modification module 204 modifies the indication 208, which may be an audio indication, a visual indication, a tactile indication, or any type of indication capable of capturing the user's attention. The presentation module 206 then presents the modified indication 108 to the client device 201.

In some embodiments, the presentation module 206 presents the indication 208 directly to the user, i.e., the presentation module 206 is coupled to the audio output of the client device 201 and modifies the ring tone as the call setup progresses, and the presentation module 206 may be coupled to an LED on the client device 201 and update the color of the LED, or a visual display on the client device 201 and update the visual display by showing percentage complete. According to some embodiments, one or more of the various types of indications are presented to the user through the client device 201. According to other embodiments, the user configures which type of indication the user would like to see in the client device 201. According to some embodiments, if the user of the client device 201 has other devices in place connected to the network 101, the indication can also appear there, for example, on a television screen.

Figure 3:
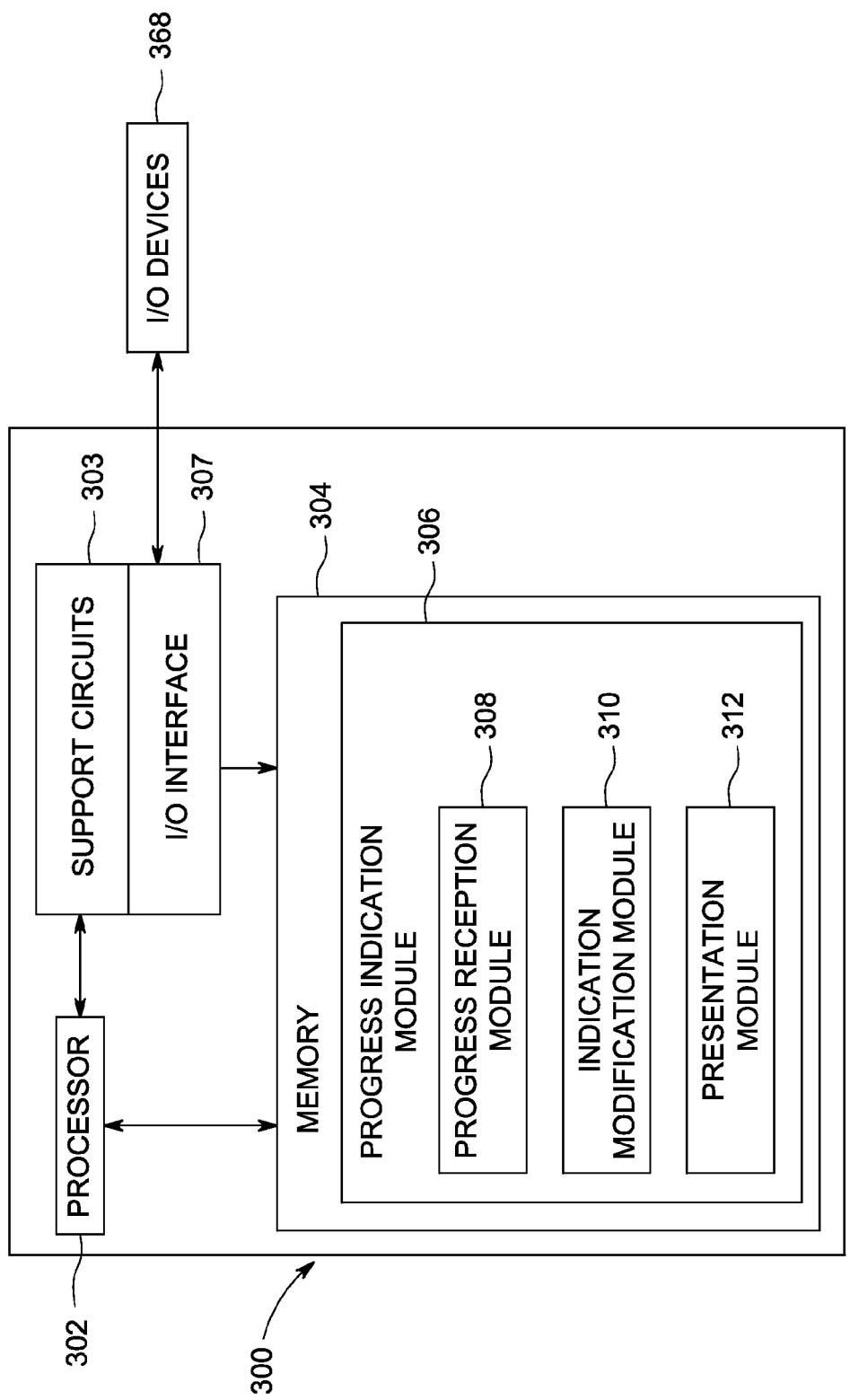
FIG. 3 is a block diagram of a computer system for implementing the progress indication apparatus of FIG. 1 in accordance with another embodiment of the present invention.

FIG. 3 depicts an implementation of the progress indicator apparatus 100 of FIG. 1 by a computer 300 in accordance with at least one embodiment of the present invention. In some embodiments, the progress indicator apparatus 100 may be implemented using a plurality of such computers, for example a group of servers. The computer 300 includes a processor 302, various support circuits 303, and memory 304. The processor 302 may include one or more microprocessors known in the art. The support circuits 303 for the processor 302 include conventional cache, power supplies, clock circuits, data registers, I/O interface 307, and the like. The I/O interface 307 may be directly coupled to the memory 304 or coupled through the support circuits 303. The I/O interface 307 may also be configured for communication with input devices and/or output devices 368 such as network devices, various storage devices, mouse, keyboard, display, video and audio sensors, IMU and the like.

The memory 304, or computer readable medium, stores non-transient processor-executable instructions and/or data that may be executed by and/or used by the processor 302. These processor-executable instructions may comprise firmware, software, and the like, or some combination thereof. Modules having processor-executable instructions that are stored in the memory 304 comprise a progress indication module 306.

As described below, in an exemplary embodiment, the progress indicator module 306 comprises a progress reception module 308, an indication modification module 310 and a presentation module 312. The computer 300 may be programmed with one or more operating systems, which may include OS/2, Java Virtual Machine, Linux, SOLARIS, UNIX, HPUX, AIX, WINDOWS, IOS, ANDROID among other known platforms.

The memory 304 may include one or more of the following random access memory, read only memory, magneto-resistive read/write memory, optical read/write memory, cache memory, magnetic read/write memory, and the like, as well as signal-bearing media as described below.

Figure 4:
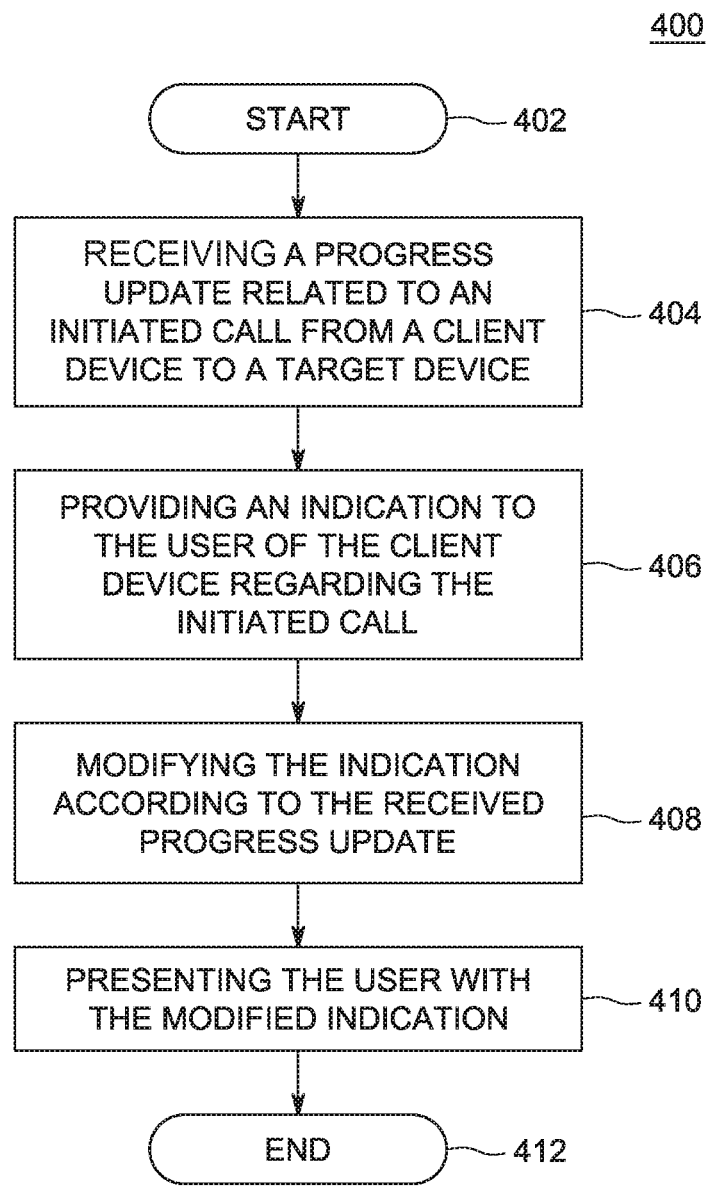
FIG. 4 depicts a flow diagram for a method for providing VoIP call setup status in accordance with another embodiment of the present invention.

FIG. 4 depicts a flow diagram for a method 400 for providing VoIP call setup status in accordance with previous embodiment of the present invention as depicted in FIGS. 1 and 2. The method 400 is an exemplary implementation of the progress indicator module 300 as executed on the computer system 300 shown in FIG. 3.

The method 400 begins at step 402 and proceeds to step 404. At step 404, the progress reception module 308 receives a progress update or notification related to an initiated call from a client device to a target device. As discussed above, the client/target device may be computer software, mobile devices, land-line devices, VoIP devices or the like. During each call setup step, the network over which the call is placed will notify the reception module 308 of any "hops" to different networks or other steps in the call setup.

When the call is initially placed, an indication is provided to the user of the client device regarding the initiation of the call at step 404. For example, an audio ring-tone is played, the client device delivers tactile feedback such as vibration, or an LED on the client device activates or blinks.

When a call setup progress notification is received by the progress reception module 308, the indication modification module 310 modifies the indication according to the received progress update at step 408. For instance, if the call setup progress indicates that authentication is complete and the call is moving to the next setup step, the progress reception module 308 receives a notification from the VoIP network, and requests that the indication modification module 310 modify the indication, whether it is an audio indication, a visual indication or the like.

At step 410, the presentation module 312 presents the user with the modified indication through the client device. The modified indication may be a modified audio ring tone, a modification of a pattern of LED lights, a visual graphic showing a progress bar, a textual display or graph of a percentage of call setup completion, a change in ring-tone pitch, frequency or the like. Embodiments of the present invention do not limit the type of indication to be presented to the user, and one of ordinary skill in the art would recognize that any type of indication may be used to keep the user updated as to the call setup progress. Alternatively, the user can configure the client device to present the user with the modified indication only at a particular progress step, i.e., the completion of the call setup progress, or when the call moves to a different network, or the like. The method terminates at step 412.

While the foregoing is directed to embodiments of the present invention, other and further embodiments of the invention may be devised without departing from the basic scope thereof, and the scope thereof is determined by the claims that follow.

The invention claimed is:

1. A method for providing voice over internet protocol (VoIP) call setup progress status comprising:
storing, by a processor, configuration parameters on a client VoIP device, wherein the configuration parameters identify which call setup stages were pre-configured by a user to trigger an indication to the client VoIP device;
creating an indication associated with a call placed from a client VoIP device in a providing network;
modifying the indication periodically based on call setup progress and the stored configuration parameters, wherein the call setup progress is determined by completion of one or more call setup stages; and
presenting the modified indication.

2. The method of claim 1 further comprising:
modifying the indication when the call setup transitions from each setup stage.

3. The method of claim 2 further comprising presenting the user with the indication as an audio indication or as a visual indication.

4. The method of claim 3 further comprising modifying a ring tone as the audio indication.

5. The method of claim 2 further comprising presenting the user with the indication as a tactile indication.

6. The method of claim 1 further comprising: modifying the indication only when the call setup progress indicates that the setup is near completion.

7. The method of claim 1 further comprising:
modifying the indication when the call setup progresses between the one or more call setup stages comprising contacting the providing network stage, performing authentication stage, determining device capability stage, and building a network path stage.

8. The method of claim 1 further comprising:
modifying the indication when the call setup progresses from the providing network to another network.

9. The method of claim 1 further comprising:
modifying the indication when the call setup hops from a first network device to a second network device in the providing network.

10. The method of claim 1 further comprising:
receiving the indication as an audio indication from the providing network; and
displaying a visual indication on the client device based on the received audio indication.

11. The method of claim 1 further comprising presenting the user with an audio indication related to call setup progress and a visual indication related to call setup progress.

12. The method of claim 1, wherein the client device is placing the call to a non-VoIP device or application, further comprising modifying the indicator when the client device receives a response from a network terminator.

13. The method of claim 1 further comprising receiving notification of the modifying of the indication from the providing network.

14. The method of claim 1 further comprising:
receiving call setup progress status at the VoIP client device; and
modifying the indication at the client device.

15. An apparatus for providing voice over internet protocol (VoIP) call setup progress status comprising:
a) at least one processor;
b) at least one input device; and
c) at least one storage device storing processor-executable instructions which, when executed by the at least one processor, perform a method including:
receiving configuration parameters on a client device, wherein the configuration parameters identify which call setup stages were pre-configured by a user to trigger an indication to the client device, receive call setup progress on a call placed from a client device and configured to present an indication of an initial call placement, wherein the call setup progress is determined by completion of one or more call setup stages, and wherein which of the one or more call setup stages trigger the indication is configurable by a user of the client device;

modifying the indication periodically based on the call setup progress; and presenting the indication each time the indication is modified.

16. The apparatus of claim 15, wherein the method further comprises:

interfacing with one of the client device and a providing network, wherein once the interfacing is complete, the client device modifies the indication to the user.

17. The apparatus of claim 16, wherein the method further comprises:

presenting the indication as one or more of an audio indication, visual indication, and a tactile indication.

18. The apparatus of claim 17 wherein the method further comprises presenting an audio indication as a modification of a ring tone.

19. A method for providing voice over internet protocol (VoIP) call setup progress status comprising:

storing, by a processor, configuration parameters on a client device, wherein the configuration parameters identify which call setup stages were pre-configured by a user to trigger an indication to the client device;

receiving a status update of a call, placed from the client device, at the client device; and creating an indication at the client device associated with the status update, wherein a created indication associated with the status update is distinct from a created indication associated with a previously received status update.

* * * * *